US009183786B2

(12) United States Patent
Yamada

(10) Patent No.: US 9,183,786 B2
(45) Date of Patent: Nov. 10, 2015

(54) CONSTANT CURRENT DRIVING CIRCUIT AND LIGHT EMITTING DIODE BACKLIGHT APPARATUS USING THE SAME

(75) Inventor: Sachiyo Yamada, Yokohama (JP)

(73) Assignee: SAMSUNG DISPLAY CO., LTD. (KR)

( * ) Notice: Subject to any disclaimer, the term of this patent is extended or adjusted under 35 U.S.C. 154(b) by 561 days.

(21) Appl. No.: 13/466,616

(22) Filed: May 8, 2012

(65) Prior Publication Data

US 2012/0313917 A1 Dec. 13, 2012

(30) Foreign Application Priority Data

Jun. 13, 2011 (JP) ................................ 2011-131682
Dec. 12, 2011 (KR) ........................ 10-2011-0133000

(51) Int. Cl.
*G06F 3/038* (2013.01)
*G09G 3/34* (2006.01)
*H05B 33/08* (2006.01)

(52) U.S. Cl.
CPC .......... *G09G 3/3406* (2013.01); *H05B 33/0815* (2013.01); *G09G 2320/0633* (2013.01); *G09G 2330/02* (2013.01)

(58) Field of Classification Search
CPC ............ G09G 3/36; H05B 37/02; G05F 3/08; G06F 3/038
See application file for complete search history.

(56) References Cited

U.S. PATENT DOCUMENTS

2009/0160422 A1* 6/2009 Isobe et al. .................... 323/349
2010/0013395 A1 1/2010 Archibald et al.

FOREIGN PATENT DOCUMENTS

| | | | |
|---|---|---|---|
| JP | 11-191958 | A | 7/1999 |
| JP | 2005-237122 | A | 9/2005 |
| JP | 2006-324671 | A | 11/2006 |
| JP | 2010040509 | A | 2/2010 |
| JP | 2010-259262 | A | 11/2010 |
| JP | 2011-109905 | A | 6/2011 |
| JP | 2011108529 | A | 6/2011 |
| JP | 2011109854 | A | 6/2011 |
| KR | 1020080113986 | A | 12/2008 |
| KR | 1020090090665 | A | 8/2009 |

* cited by examiner

*Primary Examiner* — Tony N Ngo
(74) *Attorney, Agent, or Firm* — Cantor Colburn LLP

(57) ABSTRACT

A constant current driving circuit includes a control integrated circuit which generates a switching signal, a switching device which switches an input power supply voltage based on the switching signal, a rectifying diode which rectifies a current of the input power supply voltage, a smoothing inductor which smoothes the current of the input power supply voltage, and a smoothing condenser which outputs an output current. The control integrated circuit includes a reference signal generator which generates a reference signal having information about a target constant current, a comparator which compares the current of the input power supply voltage with the reference signal, a flip-flop circuit which outputs a flip-flop signal having information about a time period during which a set state is maintained, and a delay circuit which outputs the switching signal to the switching device based on the flip-flop signal to control the switching device.

12 Claims, 16 Drawing Sheets

CONSTANT CURRENT DRIVING CIRCUIT AND LIGHT EMITTING DIODE BACKLIGHT APPARATUS USING THE SAME

This application claims priority to Korean Patent Application No. 10-2011-0133000, filed on Dec. 12, 2011, and Japanese Patent Application No. 2011-131682, filed on Jun. 13, 2011, and all the benefits accruing therefrom under 35 U.S.C. §119, the contents of which in their entirety are herein incorporated by reference.

BACKGROUND OF THE INVENTION

1. Field of the Invention

The disclosure relates to a constant current driving circuit and a light emitting diode ("LED") backlight apparatus using the constant current driving circuit.

2. Description of the Related Art

In general, a conventional constant current driving circuit is configured to detect current flowing through a load circuit in real time. For instance, the conventional constant current driving circuit is configured as shown in FIGS. 11 and 12. The conventional constant current driving circuit performs basic operations as follows.

(1) A current detector RR is connected to a light emitting diode ("LED") string including N number of LEDs in series to measure a voltage Vsen.

(2) The constant current driving circuit controls an output voltage Vout to allow the detected voltage Vsen to become equal to a target value REF and controls an output current Iout to be constant. The output voltage Vout and the output current Iout are controlled by controlling a gate voltage applied to a switching device SI. Referring to FIG. 13, the output voltage Vout and the output current Iout are controlled by adjusting a ratio of a turn-on time period $T_{on}$ to a turn-off time period $T_{off}$.

The conventional constant current driving circuit needs to detect the voltage Vsen of the current detector RR regardless of whether the switching device SI is turned on or turned off. However, since the current detector RR is connected to the load circuit in series, power loss in the current detector RR increases when the output current Tout increases.

In addition, when the current detector RR is connected to a high voltage side of the load circuit, a control integrated circuit ("IC") is required to have a high endurance to a high voltage. On the other hand, in a case where the current detector RR is connected to a low voltage side of the load circuit, the load circuit is not grounded directly at one terminal thereof.

In addition, since a signal from the current detector RR is transmitted to the control IC, the load circuit does not needed to be provided with an input pin at an output terminal thereof.

Japanese Patent Publication No. 2010-040509 (hereinafter, "patent document") discloses a conventional constant current driving circuit having a circuit configuration different than those as shown in FIGS. 11 and 12. The driving circuit disclosed in the patent document includes a current detecting resistor RISEN_i connected to the switching device in series and an inductance coil connected to the load circuit to perform basic operations as follows.

(1) A multiplier multiplies a reference signal REF, which is a desired value of an LED current, by an on/off control signal (e.g., a pulse width modulation ("PWM") signal) of the switching device SI.

(2) The current detecting resistor RISEN_i detects a monitor signal ISEN_i. Since the current detecting resistor RISEN_i is connected to the switching device SI in series, the monitor signal ISEN_i is equal to the current flowing through the switching device SI. The monitor signal ISEN_i is calculated based on the following Equations 1 and 2. A differential amplifier compares a result of Equation 1 with the monitor signal ISEN_i to obtain a control signal PWM_i.

$$Iled = ISEN\_i/\mathrm{PWM\_}i \qquad \text{[Equation 1]}$$

$$ISEN\_i = REF \times \mathrm{PWM\_}i \qquad \text{[Equation 2]}$$

FIG. 14 shows a relationship between the LED current Iled, the monitor signal ISEN_i, and the PWM signal PWM_i in the conventional constant current driving circuit disclosed in the patent document.

(3) The control signal PWM_i is feedback controlled such that the result of Equation 2, i.e., "REF×PWM_i," becomes equal to the monitor signal ISEN_i. In other words, the control signal PWM_i is feedback controlled to allow the LED current Iled to become equal to the desired value of the LED current.

The reference signal REF, the monitor signal ISEN_i, and current $I_L$ in the inductance coil have waveforms, which are respectively shown in FIG. 9 of the patent document.

However, since the driving circuit disclosed in the patent document requires the multiplier, a circuit configuration of a switching balance controller becomes complex. In addition, the differential amplifier generates the control signal PWM_i based on the monitor signal ISEN_i, which is obtained by using the control signal PWM_i. That is, according to the driving circuit disclosed in the patent document, a convergence defect exists in feedback control of the control signal PWM_i.

BRIEF SUMMARY OF THE INVENTION

Exemplary embodiments of the invention provide a constant current driving circuit capable of controlling a constant current using a converter.

Exemplary embodiments of the invention provide a light emitting diode ("LED") backlight apparatus having the constant current driving circuit.

According to an exemplary embodiment, a constant current driving circuit includes a control integrated circuit which generates a switching signal, a switching device, a rectifying diode, a smoothing inductor, and a smoothing condenser. The switching device includes an input terminal to which an input power supply voltage is applied and switches the input power supply voltage based on the switching signal. The rectifying diode rectifies a current of the input power supply voltage switched by the switching device, the smoothing inductor smoothes the current of the input power supply voltage, and the smoothing condenser outputs an output current. The control integrated circuit includes a reference signal generator which generates a reference signal having information about a target constant current, a comparator which compares the current of the input power supply voltage with the reference signal to output a reset signal, a flip-flop circuit which outputs a flip-flop signal having information about a time period during which a set state is maintained based on an external clock received as a set signal and the reset signal, and a delay circuit which outputs the switching signal to the switching device based on the flip-flop signal to control the switching device.

According to an exemplary embodiment, a constant current provided to a load circuit may be controlled to have a desired level without using a multiplier, and thus a circuit configuration of the constant current driving circuit may be simplified.

According to an exemplary embodiment, the constant current driving circuit may include a load circuit driven at a constant current, a constant power supply voltage connected to a high voltage terminal of the load circuit, a converter connected to a low voltage side of the load circuit, and a control integrated circuit connected to the converter to generate a switching signal may be included. The converter may include a switching device, a rectifying diode, a smoothing inductor, a smoothing condenser, and a resistor. The switching device may include an input terminal to which an input power supply voltage is applied and switch the input power supply voltage based on the switching signal. The rectifying diode may rectify a current of the input power supply voltage switched by the switching device, the smoothing inductor smoothes the current of the input power supply voltage, and the smoothing condenser outputs an output current. The resistor may include a first terminal connected to a low voltage terminal of the switching device and a second terminal grounded.

In an exemplary embodiment, the control integrated circuit may include a reference signal generator which generates a reference signal having information about a target constant current, a comparator which compares the current of the switching device with the reference signal to output a reset signal, a flip-flop circuit which outputs a flip-flop signal having information about a time period during which a set state is maintained based on an external clock received as a set signal and the reset signal, and a delay circuit which outputs the switching signal to the switching device based on the flip-flop signal to control the switching device. The current of the switching device may be measured based on a current flowing through the resistor.

According to an exemplary embodiment of the constant current driving circuit, since a time duration required for the current flowing through the switching device to reach a desired current value is controlled, the constant current may be controlled by setting the desired current value without inductance and voltage of the inductor.

In one exemplary embodiment, the constant current driving circuit may be configured to include a current detector which detects a current provided to the switching device and a slope compensation circuit connected between the current detector and the comparator. Thus, even when a duty cycle is equal to or larger than 50%, the current flowing through the inductor may be stabilized.

In addition, in an exemplary embodiment, an inductance of the smoothing inductor, a capacitance of the smoothing condenser, and a period of the set signal may be determined such that the current flowing through the smoothing inductor has a value larger than zero when the switching device is in a turned-on state or a turned-off state. According to an exemplary embodiment of the constant current driving circuit, the current of the smoothing inductor has a value larger than zero (0) when the switching device SI is in the turned-off state.

In addition, in an exemplary embodiment, the constant current driving circuit may be configured to a control circuit which applies an OFF signal to the switching device independent from the delay circuit and compulsively transits the state of the switching device to the turned-off state. Thus, the start and stop of the operation of the load circuit may be freely controlled.

According to an exemplary embodiment, a light emitting apparatus may include a plurality of light emitting devices connected to one another in parallel and a constant current driving circuit having the above-mentioned configuration, which allows the light emitting devices to be driven at a constant current. According to an exemplary embodiment, cathodes of an LED string are commonly grounded, and thus wires for the LED string may be easily designed.

According to an exemplary embodiment, a liquid crystal display may include a liquid crystal panel and a light emitting apparatus having the above-mentioned configuration, which is prepared as a backlight for the liquid crystal panel. Since the liquid crystal display includes the constant current driving circuit, power consumption in the liquid crystal display may be reduced.

According to an exemplary embodiment, the constant current driving circuit may control the constant current only by using the converter even though no detector is installed at an output side thereof, and the constant current driving circuit may control the constant current only by detecting the ON state of the switching device.

In addition, since the time duration required for the current flowing through the switching device to reach a desired current value is controlled, the target constant current may be set to a constant value without depending on the current of the smoothing inductor.

In addition, since the detector is not installed at the output side of the constant current driving circuit, power consumption caused by detecting the current of the switching device may be reduced.

In addition, the cathodes of the LED string are directly grounded. That is, cathodes of the LED string are commonly grounded, and thus wires for the LED string may be easily designed.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE INVENTION

Figure 1:
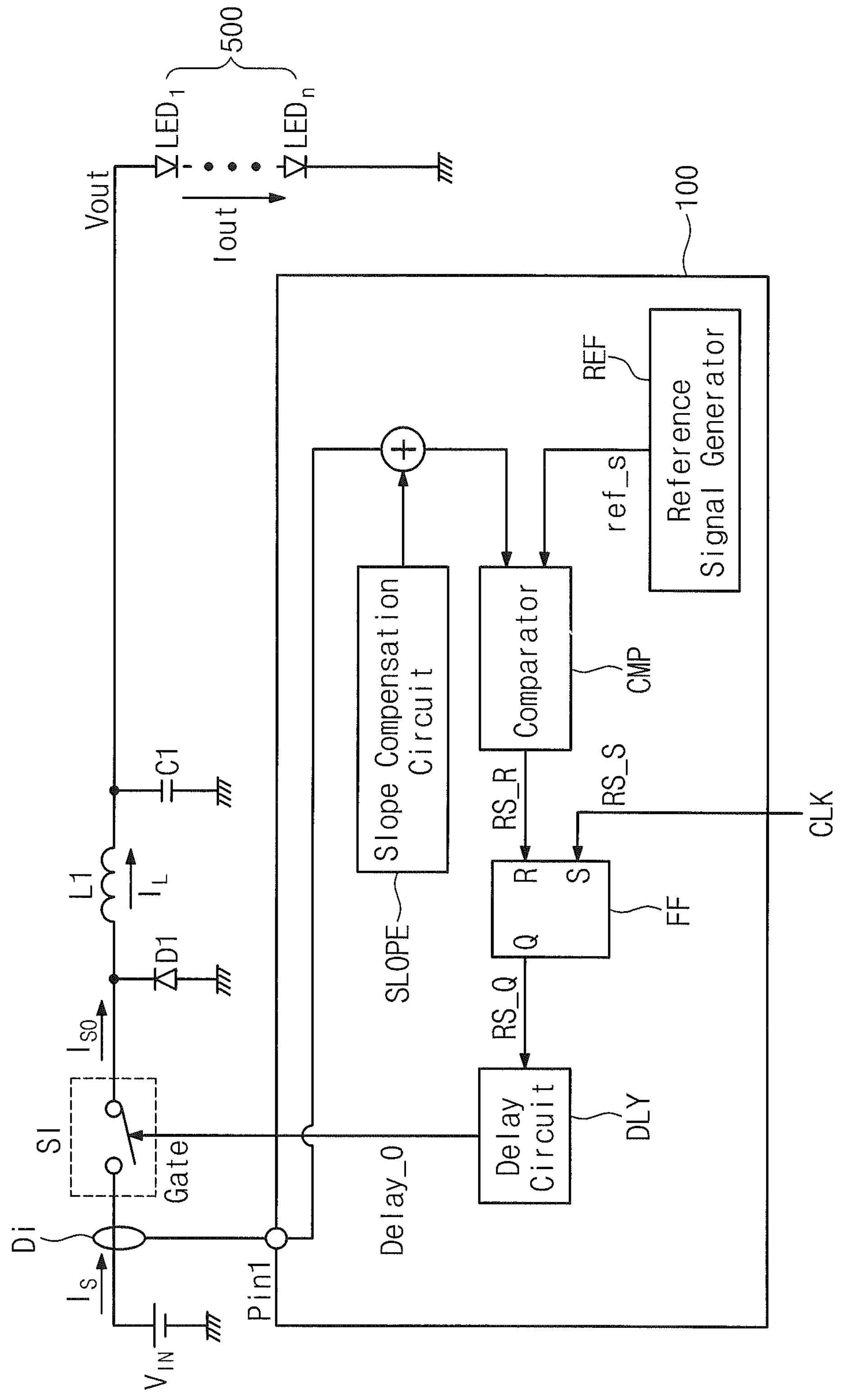
FIG. 1 is a block diagram showing an exemplary embodiment of a constant current driving circuit according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in further detail with reference to the accompanying drawings.

FIG. 1 is a block diagram showing an exemplary embodiment of a constant current driving circuit according to the invention. In detail, FIG. 1 shows a light emitting diode ("LED") driving circuit that drives an LED string 500 configured to include N number of LEDs, $LED_1, \ldots, LED_n$, (n>1). The constant current driving circuit in the LED driving circuit is a voltage-drop type.

According to the exemplary embodiment of the constant current driving circuit, a current value of a target constant current $I_{target}$ is i predetermined, and the LED string 500 is driven at the target current value $I_{target}$.

The LED driving circuit includes a switching device SI, a control integrated circuit ("IC") 100, a rectifying diode D1, a smoothing inductor L1, a smoothing condenser C1, and the LED string 500 including N number of LEDs $LED_1$, . . . $LED_n$ (N>1).

One terminal of the switching device SI is directly connected to a terminal of an input power supply voltage $V_{IN}$.

Figure 2A:
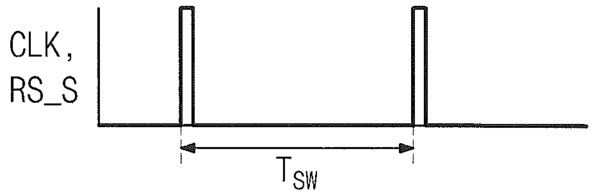
FIG. 2A is a view showing an exemplary embodiment of a clock signal provided as a set signal from an outside of the constant current driving circuit shown in FIG. 1.

The switching device SI is gate-controlled by the control IC 100. The control IC 100 receives a clock CLK from an outside as a set signal RS_S, which is shown in FIG. 2A. The switching device SI is turned on or turned off by a switching signal Delay_O generated by the control IC 100 based on the set signal RS_S. An output current $I_{SO}$ of the switching device SI is smoothed by the rectifying diode D1, the smoothing inductor L1, and the smoothing condenser C1, and thus a current Iout is provided to the LED string 500.

The control IC 100 includes a reference signal generator REF, a comparator CMP, a flip-flop circuit FF, and a delay circuit DLY.

A reference signal generator REF generates a reference signal ref_s including information about the target constant current $I_{target}$. The reference signal generator REF applies the reference signal ref_s to the comparator CMP.

The comparator CMP compares the target constant current $I_{target}$ with a current $I_s$ (hereinafter, referred to as current of the switching device SI) of the input power supply voltage VIN, which is directly provided to the switching device SI. When the switching device SI is turned on, the current $I_S$ of the switching device SI and a current $I_L$ of the smoothing inductor L1 are as shown as FIGS. 2C and 2D.

Figure 3A:
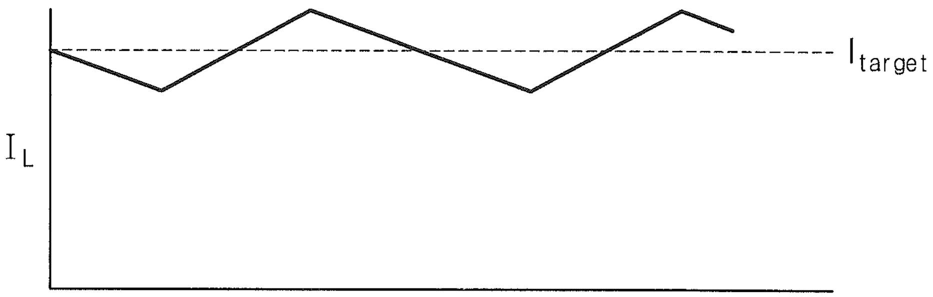
FIG. 3A is an enlarged view of the waveform of the current flowing through the smoothing inductor and the target constant current shown in FIG. 2C.

That is, the current $I_S$ of the switching device SI linearly increases as the waveform of the current $I_L$ of the smoothing inductor L1 shown in FIG. 3A during the turned-on period. The waveform of the current $I_s$ of the switching device SI is detected by a current detector Di.

Figure 2B:
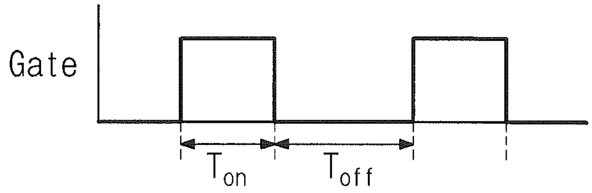
FIG. 2B is a view showing a signal output from a delay circuit to control a gate of a switching device shown in FIG. 1.
Figure 2C:
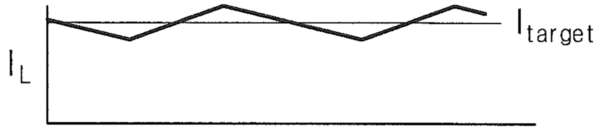
FIG. 2C is a view showing a waveform of a current flowing through a smoothing inductor shown in FIG. 1 and a target constant current.
Figure 2D:
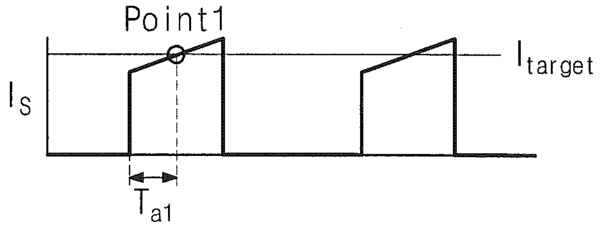
FIG. 2D is a view showing a waveform of a current flowing through a switching device shown in FIG. 1.
Figure 2E:
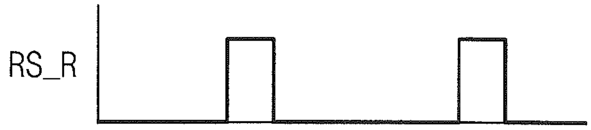
FIG. 2E is a view showing a reset signal output from a comparator of FIG. 1 and applied to a reset terminal of a flip-flop circuit.
Figure 2F:
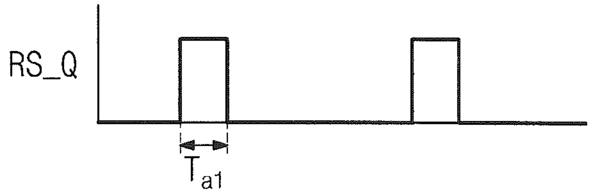
FIG. 2F is a view showing a flip-flop signal output from an output terminal of a flip-flop circuit shown in FIG. 1 and applied to a delay circuit.
Figure 2G:
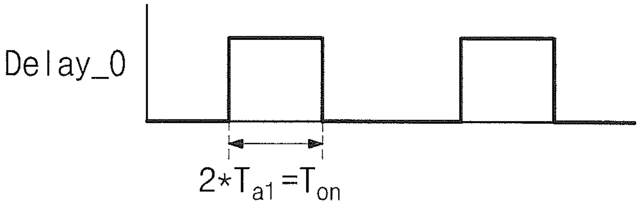
FIG. 2G is a view showing a switching signal output from a delay circuit shown in FIG. 1 and applied to a gate of a switching device.

However, when an ON-duty ratio of the gate control signal Delay_O of the switching device SI shown in FIG. 2G is equal to or greater than 50%, the current $I_S$ of the switching device SI may be oscillated. Accordingly, the constant current driving circuit according to this exemplary embodiment further includes a slope compensation circuit SLOPE so as to compensate for the oscillation. Hereinafter, the current $I_S$ of the switching device SI refers to a current obtained by slope-compensating the current $I_S$ of the switching device SI, which is detected by the current detector Di.

Figure 3B:
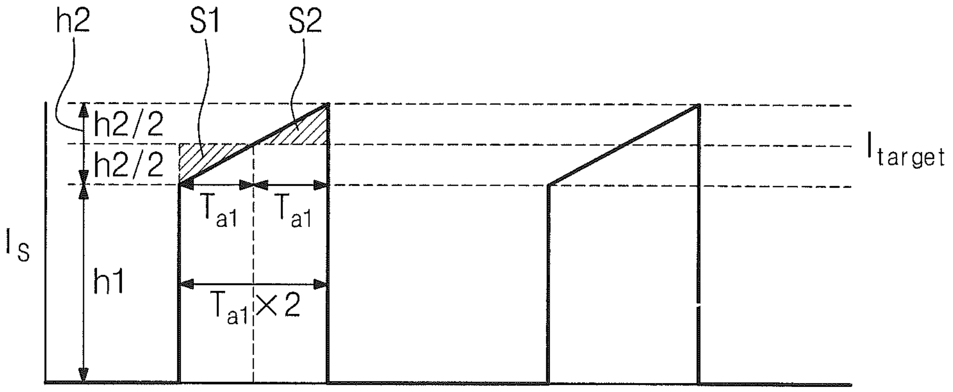
FIG. 3B is an enlarged view of the waveform of the current flowing through the switching device shown in FIG. 2D.

The current $I_S$ of the switching device SI has a waveform as shown in FIGS. 2D and 3B.

The comparator CMP detects a time point Point1 at which the current $I_S$ of the switching device SI reaches the target constant current $I_{target}$ and outputs a reset signal RS_R shown in FIG. 2E.

The flip-flop circuit FF includes an input terminal S, a reset terminal R, and an output terminal Q.

The clock CLK is input to the input terminal S of the flip-flop circuit FF as the set signal RS_S as shown in FIG. 2A. When the set signal RS_S is input to the input terminal S, the flip-flop circuit FF is placed in a set state. Then, the reset signal RS_R as shown in FIG. 2E is input to the reset terminal R at the time point Point1. The flip-flop circuit FF is maintained in the set state during a time period $T_{a1}$ from a time point at which the set signal RS_S is input to the time point Point1 at which the reset signal RS_R is input. The flip-flop circuit FF outputs a flip-flop signal RS_Q through the output terminal Q, and the flip-flop signal RS_Q is input to the delay circuit DLY. The flip-flop signal RS_Q is a pulse signal as shown in FIG. 2F and includes information about the time period $T_{a1}$.

The delay circuit DLY applies the switching signal Delay_O as shown in FIG. 2G to the switching device SI. The switching device SI is maintained in the turned-on state in response to the switching signal Delay_O during a time period $T_{on}$ that is two times longer than the time period $T_{a1}$. Thus, the switching device SI may be gate-controlled as shown in FIG. 2B.

The switching device SI is controlled at a period $T_{SW}$ as the set signal RS_S shown in FIG. 2A. As shown in FIG. 2B, the switching device SI is in the turned-on state during the time period $T_{on}$ and is in the turned-off state during a time period $T_{off}$, which is ($T_{SW}$-$T_{on}$). That is, the switching device SI is transited to the turned-off state after the time period $T_{on}$ elapses from a start of the turned-on state.

The constant current driving circuit controls an operation frequency and an operation period to be constant and controls the turned-on and turned-off time periods of the switching device SI using the control IC 100 by means of a pulse width modulation ("PWM") scheme.

The constant current driving circuit does not limit the period $T_{SW}$, which is the operation period. As shown in FIGS. 2C and 3A, the current $I_L$ of the smoothing inductor L1 has a value larger than zero (0) when the switching device SI is in the turned-off state. In the exemplary embodiment, an inductance of the smoothing inductor L1, a capacitance of the smoothing condenser C1, and the period $T_{SW}$ of the set signal RS_S, which is the clock CLK, are preferably determined such that the current $I_L$ flowing through the smoothing inductor L1 has the value larger than zero when the switching device SI is in the turned-on or turned-off state.

As described above, in the constant current driving circuit according to the exemplary embodiment, the current $I_L$ of the smoothing inductor L1 is linearly increased within the time period $T_{on}$. Accordingly, a current component S1 below the target constant current $I_{target}$ in a first half of the time period $T_{on}$ is equal to a current component S2 exceeding the target constant current $I_{target}$ in a later half of the time period $T_{on}$, as expressed in the following Equation 3.

$$S1=\tfrac{1}{2}\times(I_{target}-h1)\times T_{a1}=S2=\tfrac{1}{2}\times h2\times T_{a1} \qquad \text{[Equation 3]}$$

In Equation 3, h1 denotes a value of the current $I_L$ of the smoothing inductor L1 measured at a beginning of the turned-on state of the switching device SI, and h2 denotes a difference between the current value h1 and a value of the current $I_L$ of the smoothing inductor L1 measured at a beginning of the turned-off state of the switching device SI.

As the current value h2 and the difference between the current value h1 and the target constant current $I_{target}$ decrease, the variation of the current $I_L$ of the smoothing inductor L1 becomes smaller during the period $T_{SW}$, and the LED string 500 is continuously driven by current closer to the target constant current $I_{target}$ regardless of the turned-on or turned-off state of the switching device SI.

In this exemplary embodiment, a time duration $T_{on}$ of the turned-on state of the switching device SI in Equation 3 is two times longer than a time duration $T_{a1}$ during which the current $I_S$ of the switching device SI reaches the target constant current $I_{target}$ after the start of the turned-on state of the switching device SI.

On the other hand, when the switching device SI is in the turned-on state, charging of the smoothing inductor L1 may not be affected by performance of the smoothing inductor L1 or a level of a voltage applied to the smoothing inductor L1. Therefore, when a size of the smoothing inductor L1 increases, a charging time of the smoothing inductor L1 and a measurement time period T are increased.

In addition, by using only the measurement time period T during which the current $I_L$ of the switching device SI reaches a certain current value I before reaching the target constant current $I_{target}$, the time period $T_{on}$ of the turned-on state of the switching device SI may be determined. In this case, the time period $T_{on}$ is determined by the following Equation 4.

$$T_{on}=2\times I_{target}/I\times T \quad \text{[Equation 4]}$$

Figure 4:
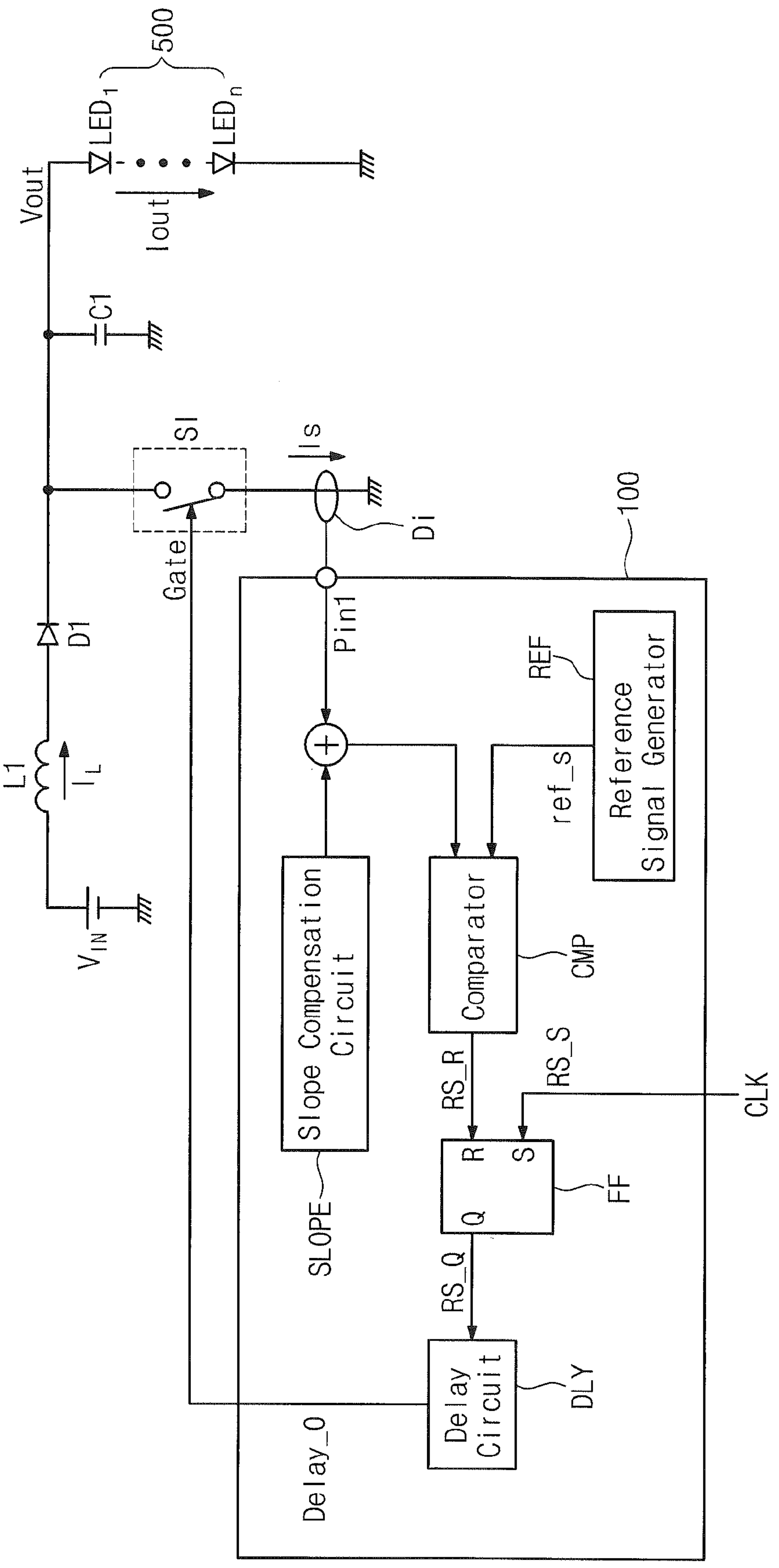
FIG. 4 is a block diagram showing another exemplary embodiment of a constant current driving circuit according to the invention.

The constant current driving circuit according to this exemplary embodiment is described as a voltage-drop type. However, it should be noted that, in an alternative embodiment, the constant current driving circuit may be a voltage-boosting type. FIG. 4 shows another exemplary embodiment of a constant current driving circuit of the voltage-boosting type according to the invention. In FIG. 4, like reference numerals denote like elements in FIG. 1, and thus repetitive explanation will be omitted.

Figure 5:
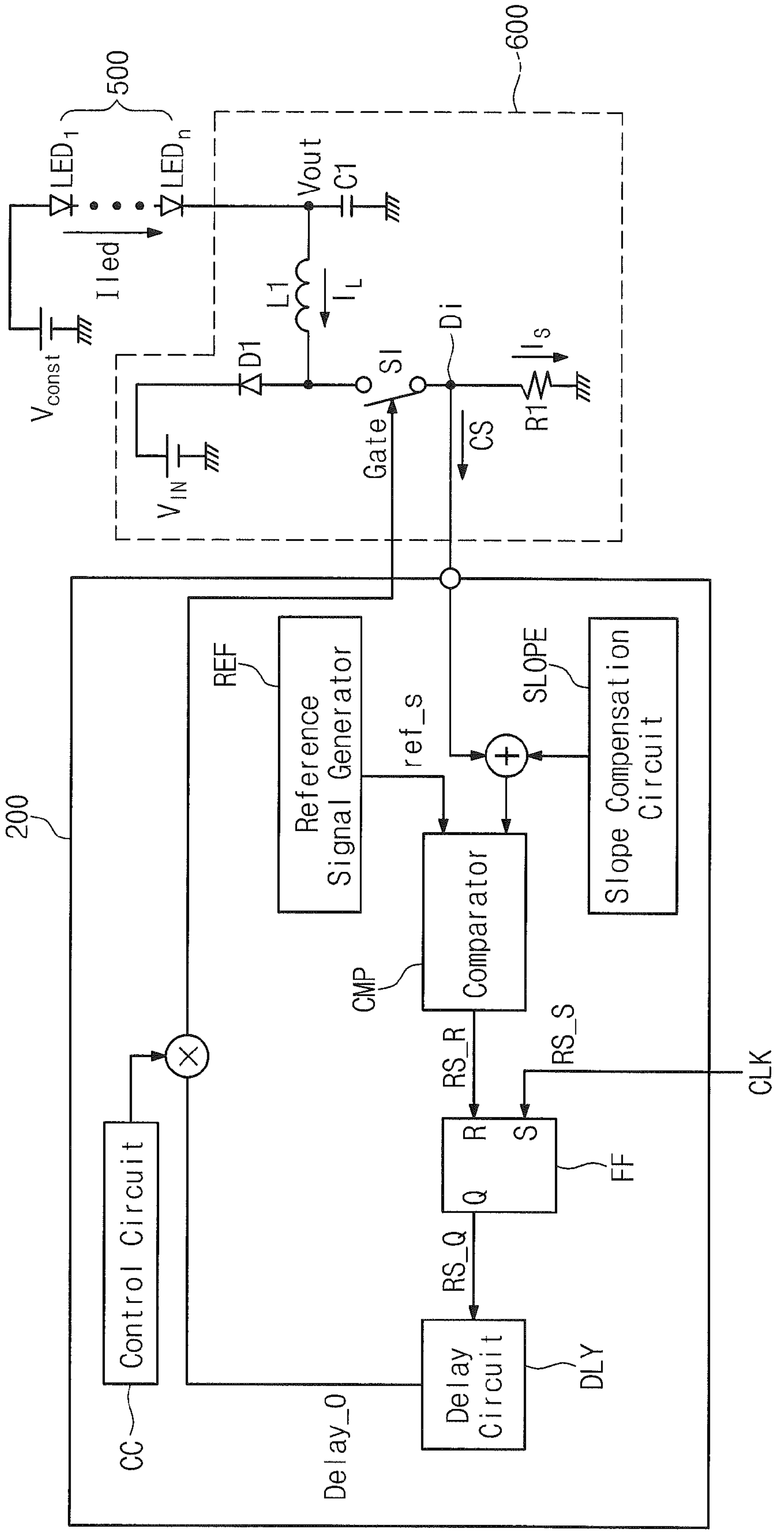
FIG. 5 is a block diagram showing yet another exemplary embodiment of a constant current driving circuit according to the invention.

FIG. 5 is a block diagram showing yet another exemplary embodiment of a constant current driving circuit according to the invention. In this exemplary embodiment, a high voltage side of an LED string 500 is connected to a constant source voltage $V_{const}$ and a low voltage side of the LED string 500 is connected to a converter 600.

The converter 600 includes a switching device SI, a rectifying diode D1, a smoothing inductor L1, a smoothing condenser C1, and a resistor R1. The converter 600 is driven by a control IC 200 to allow the LED string 500 to be driven at the target constant current $I_{target}$.

The control IC 200 has the same structure and function as those of the control IC according to the exemplary embodiments of FIGS. 1 and 4 except that the control IC 200 includes a control circuit CC connected between the switching device SI and the delay circuit DLY.

In addition, the control circuit CC applies an ON signal or an OFF signal to the switching device SI independently from the delay circuit DLY to place the switching device SI in the turned-on or turned-off state. Thus, the switching device SI according to this exemplary embodiment is transited to the turned-on or turned-off state by logically multiplying the switching signal Delay_O output from the delay circuit DLY by the ON/OFF signal from the control circuit CC. That is, the control circuit CC controls the ON/OFF of the LED string 500. The constant current driving circuit may be repeatedly turned on and off at a high frequency to control brightness by means of light pulse width modulation. In addition, when the ON/OFF control of the LED string 500 is not needed, the switching signal Delay_O output from the delay circuit DLY is directly input to the switching device SI, and thus the switching device SI may be gate-controlled.

In addition, a low voltage side of the switching device SI is connected to an end of the resistor R1 of which another end is connected to a ground, and the current $I_S$ of the switching device SI is measured from the current flowing through the resistor R1. The current $I_S$ of the switching device SI is detected by the current detector Di and the current detector Di applies a detection signal CS having information about the detected current $I_S$ to a comparator CMP. The detection signal CS may be a low voltage signal. Accordingly, power consumption in the constant current driving circuit may be reduced in case of controlling plural LED strings.

Figure 6:
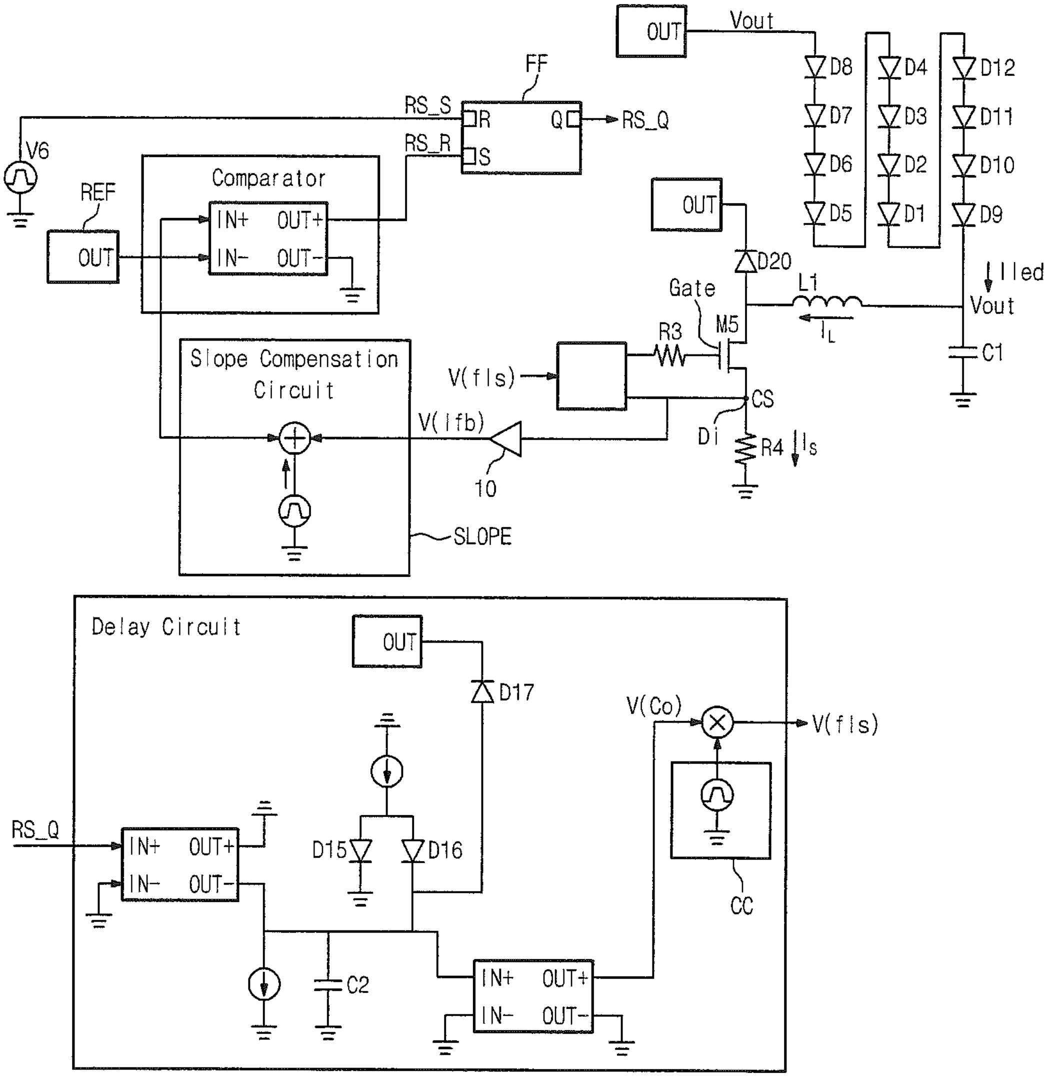
FIG. 6 is a circuit diagram used to simulate an operation of the constant current driving circuit shown in FIG. 5.

FIG. 6 is a circuit diagram used to simulate an operation of the constant current driving circuit shown in FIG. 5, and FIGS. 7A to 7E are views showing signals used in the circuit diagram shown in FIG. 6.

Figure 7A:
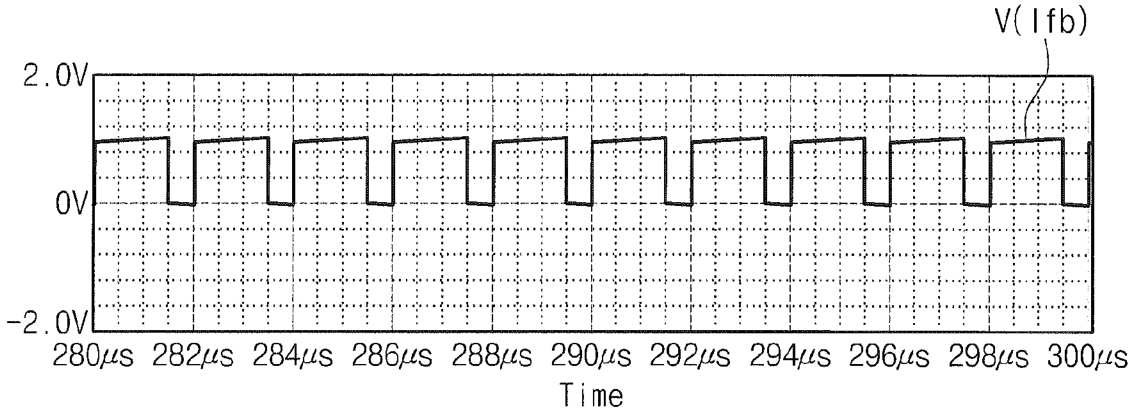
FIG. 7A is a view showing a detection signal in volts (V) with respect to time in microseconds (μs), shown in FIG. 5, which is amplified by an amplifier.

A voltage signal V(Ifb) shown in FIG. 7A is an output signal obtained by amplifying the detection signal CS, which is detected by the current detector Di, using an amplifier 10. In addition, the waveform of the voltage signal V(Ifb) shown in FIG. 7A corresponds to a waveform of the current $I_S$ flowing through a switching device M5 and a resistor R4 that is grounded. When comparing the waveform shown in FIG. 7A with the waveform shown in FIG. 2D, it is shown that the waveform of the voltage signal V(Ifb) corresponds to the waveform of the current $I_S$.

The LED string 500 configured to include light emitting diodes D1 to D12 is directly affected by the switching device M5. The waveform of the current $I_L$ flowing through the smoothing inductor L1 is represented by the waveform of the current $I_S$. Accordingly, the current $I_L$ flowing through the smoothing inductor L1 may be monitored by measuring the voltage signal V(Ifb). A current Ifled flowing through the LED string 500 and the current $I_L$ flowing through the smoothing inductor L1 are smoothed by the capacitor C1.

The voltage signal V(Ifb) is slope-compensated by the slope compensation circuit SLOPE, input to the comparator, and compared with a voltage signal corresponding to the target constant current $I_{target}$. In addition, the constant current $I_{target}$ and the voltage signal corresponding to the target constant current $I_{target}$ are set by the reference signal generator REF as described above.

The comparator detects a timing point Point1 at which the voltage signal corresponding to the current $I_S$ is matched with the voltage corresponding to the target constant current $I_{target}$ and outputs a reset signal RS_R corresponding to the waveform shown in FIG. 2E.

The flip-flop circuit FF is placed in a set state by a set signal RS_S (refer to FIGS. 7B and 2A) input to an input terminal S thereof based on an external clock V6 and receives the reset signal RS_R through a reset terminal R thereof at the time point Point1. The flip-flop circuit FF is maintained in the set state during a time period $T_{a1}$ from an input of the clock CLK (or the set signal RS_S) to the time point Point1 at which the reset signal RS_R is input. The pulse signal (refer to FIG. 2F) having a period of $T_{a1}$ output from the output terminal Q of the flip-flop circuit FF is input to the delay circuit DLY.

Figure 7B:
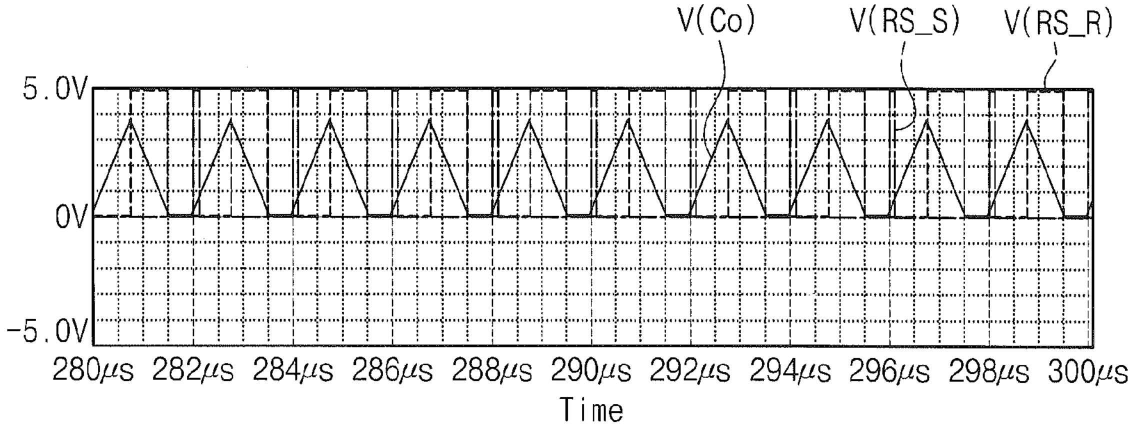
FIG. 7B is a view showing a clock signal in volts (V) with respect to time in microseconds (μs), input to an input terminal and a reset signal input to a reset terminal of a flip-flop circuit shown in FIG. 6.

The delay circuit generates a pulse signal V(Co) shown in FIG. 7B to be output to control the switching device M5 during a time period $T_{on}$ two times longer than the time period $T_{a1}$ to allow the switching device M5 to maintain the turned-on state.

Referring to FIG. 6, the delay circuit includes a control circuit CC. The control circuit CC applies the ON/OFF signal to the switching device M5 to compulsively transit the switching device M5 to the turned-off state. In this case, a unit of measure a horizontal axis in FIGS. 7A and 7B is 1/20 times smaller than that of a horizontal axis in FIGS. 7C to 7E.

The switching device M5 is transited to the turned-on state or the turned-off state based on a signal obtained by logically multiplying the pulse signal V(Co) by the ON/OFF signal from the control circuit CC.

Figure 7C:
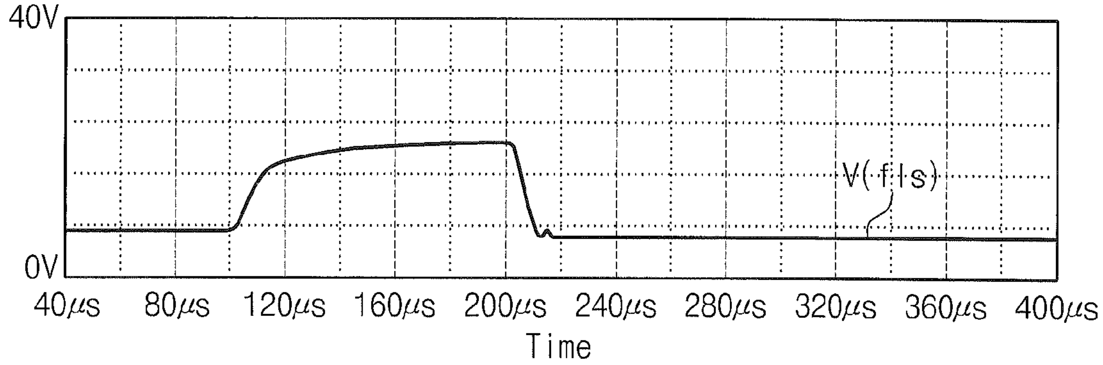
FIG. 7C is a view showing a pulse signal from a delay circuit and an output voltage in volts (V) with respect to time in microseconds (μs), of a cathode terminal of an LED string shown in FIG. 6.
Figure 7D:
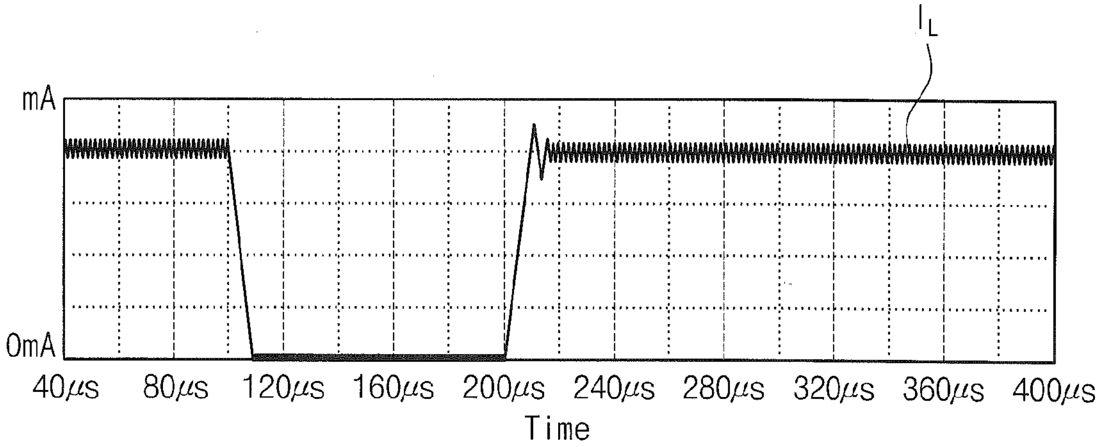
FIG. 7D is a view showing a current in milliamperes (mA) with respect to time in microseconds (μs), flowing through an inductor shown in FIG. 6.
Figure 7E:
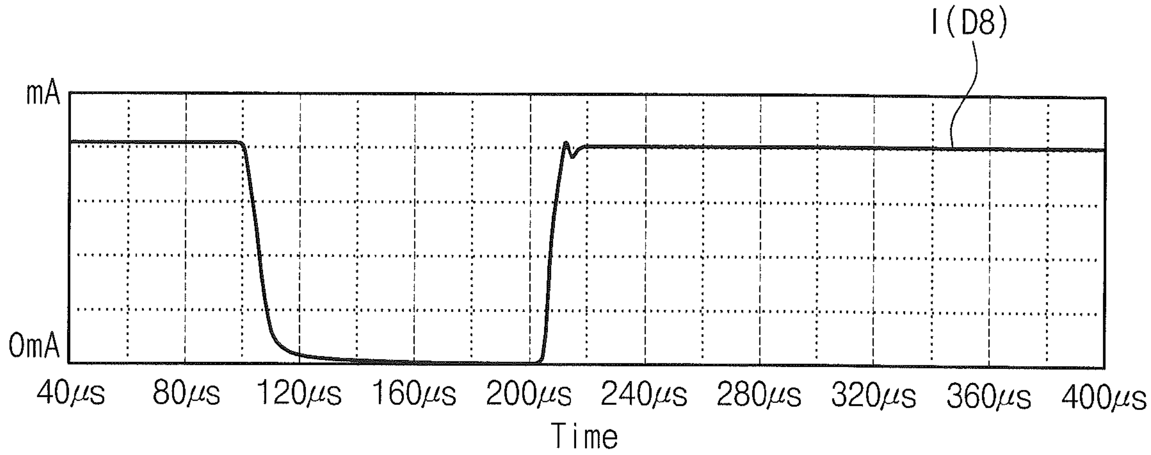
FIG. 7E is a view showing a current in milliamperes (mA) with respect to time in microseconds (μs), flowing through a diode shown in FIG. 6.

According to the simulation circuit shown in FIG. 6, an electric potential of V(fls) of the ground condenser C1, the current $I_L$ of the inductor L1, and current I(D8) of a diode D8 are represented as shown in FIGS. 7C, 7D, and 7E, respectively. In addition, the electric potential V(fls) shown in FIG. 7C corresponds to the signal obtained by logically multiplying the pulse signal V(Co) by the ON/OFF signal from the control circuit CC, and the current $I_L$ and the current I(D8) becomes substantially zero ampere (A) in a case where the electric potential of V(fls) is equal to or higher than that of an anode of the diode D20.

Referring to FIGS. 7D and 7E, the current $I_L$ flowing through the inductor L1 and the current I(D8) flowing through the diode D8 are substantially similar to each other. As described above, according to the constant current driving circuit of the exemplary embodiment, the LED string 500 may be driven at the target constant current $I_{target}$ by measuring the current $I_S$ flowing through the resistor R4 that is grounded.

That is, the constant current driving circuit controls the time period $T_{a1}$ required for the current $I_S$ of the switching device SI to reach the desired current value. Accordingly, the desired constant current value may be obtained without depending on reactance or voltage of the inductor. In addition, according to this exemplary embodiment, the current detector Di is provided at an output terminal of the LED string 500 so that the output current Iled or the output voltage of the LED string 500 do not need to be detected. Thus, power loss in the constant current driving circuit may be effectively prevented. In addition, according to the constant current driving circuit of the exemplary embodiment, only the current $I_S$ flowing through the grounded resistor R4 when the switching device SI is in the turned-on state is detected. Thus, the current flowing through the load circuit driven under the constant current does not need to be detected constantly. Thus, the power loss in the constant current driving circuit may be effectively prevented.

Figure 8:
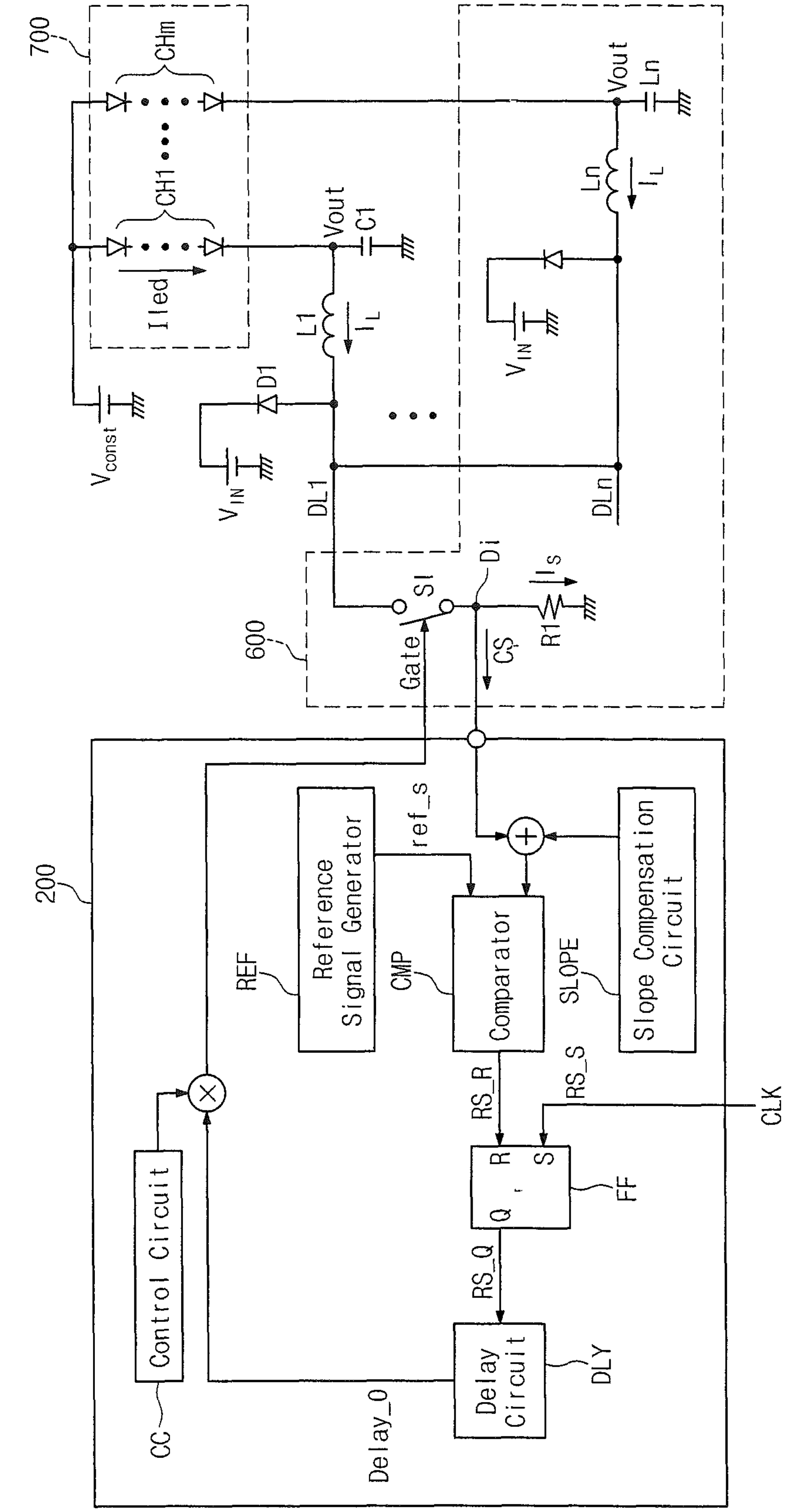
FIG. 8 is a block diagram showing yet another exemplary embodiment of a constant current driving circuit according to the invention.

FIG. 8 is a block diagram showing yet another exemplary embodiment of a constant current driving circuit according to the invention. In FIG. 8, the constant current driving circuit includes M number of LED strings 700 (M>2), wherein each LED string CH1 to CHm has substantially the same structure and function as those of the LED string shown in FIG. 5. That is, the M number of LED strings 700 are connected to the converter and the control IC shown in FIG. 5 and independently controlled.

In addition, high voltage output terminals of the M number of LED strings 700 are connected to a constant source voltage Vconst in parallel. An i-th LED string CHi of the M number of LED strings 700 is connected to a terminal DLi (not shown) of the control IC corresponding to the i-th LED string CHi, and thus one LED string may be connected to one corresponding terminal.

In addition, in this exemplary embodiment, the load circuit driven under the constant current is the M number of LED strings 700, however, it should be noted that the invention is not be limited thereto. In an alternative exemplary embodiment, the load circuit may be one of various load circuits other than the LED string, such as, for example, a gas sensor, a stepping motor, or a pulse motor.

Figure 9:
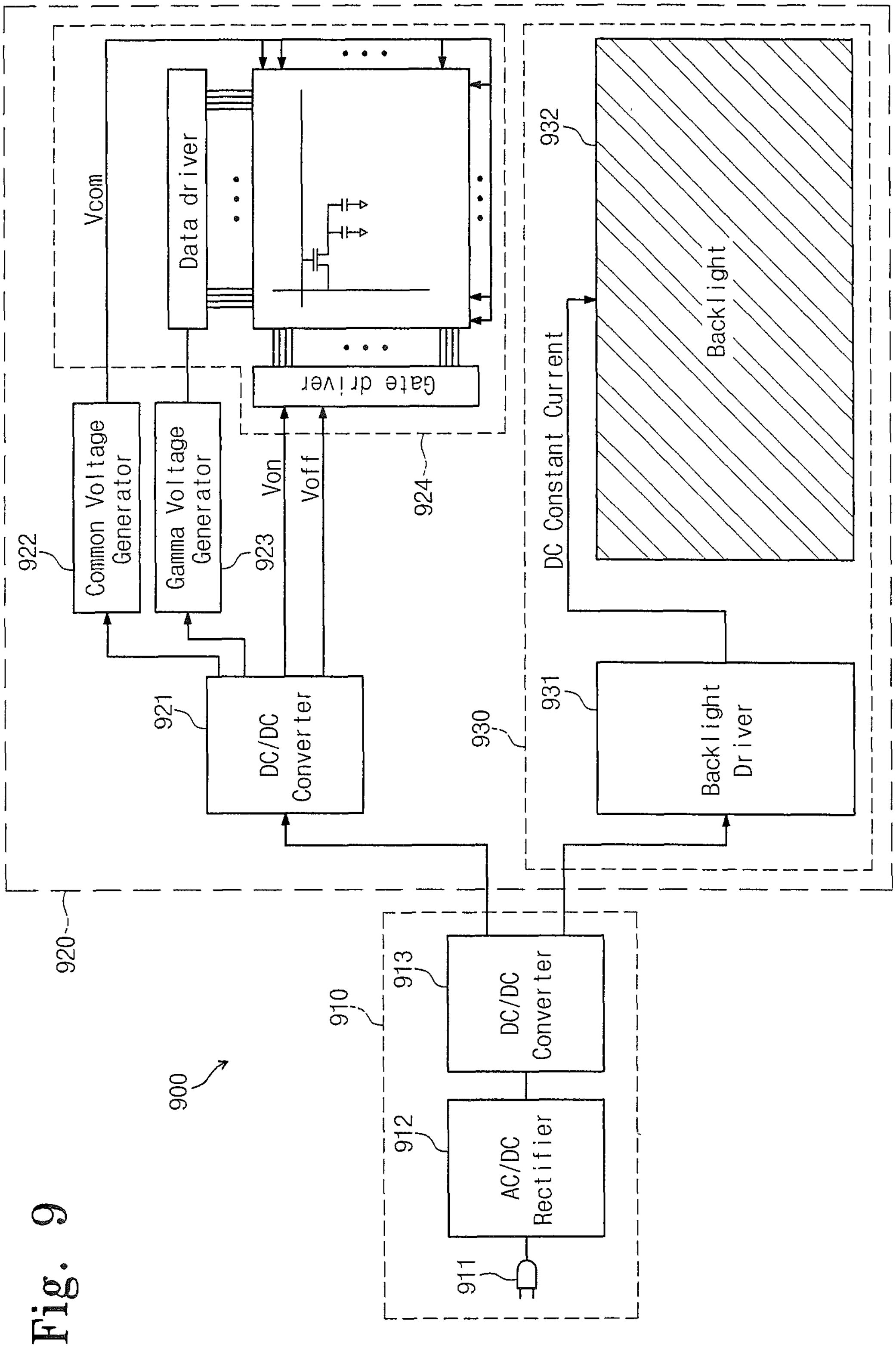
FIG. 9 is a block diagram showing an exemplary embodiment of a liquid crystal display according to the invention.

FIG. 9 is a block diagram showing an exemplary embodiment of a liquid crystal display according to the invention.

Referring to FIG. 9, the liquid crystal display 900 includes an AC/DC power supply 910 and an LCD module 920. The LCD module 920 includes a backlight unit 930 and the backlight unit 930 includes a backlight driver 931 and a backlight 932.

The AC/DC power supply 910 includes a plug 911, an AC/DC rectifier 912, and a DC/DC converter 913. The AC/DC power supply 910 converts an alternating current ("AC") voltage, e.g., 100 volts or 240 volts, into a direct current ("DC") voltage and provides the direct current voltage to the LCD module 920.

The LCD module 920 includes a DC/DC converter 921, a common electrode voltage generator (or Vcom generator) 922, a gamma voltage generator 923, an LCD panel part 924, and the backlight unit 930. The LCD module 920 receives an image data from an external graphic controller (not shown) and displays an image based on the received image data.

The LCD panel part 924 includes a thin film transistor substrate (not shown), a color filter substrate (not shown) facing the thin film transistor substrate, and a liquid crystal layer (not shown) interposed between the thin film transistor substrate and the color filter substrate. The thin film transistor substrate includes a display area and a non-display area, and a gate driver and a data driver are arranged in the non-display area. The display area includes a plurality of gate lines extended from the gate driver and a plurality of data lines extended from the data driver and insulated from and crossing the gate lines. The gate lines and the data lines define a plurality of pixel areas.

Although not shown in FIG. 9, each pixel area includes a thin film transistor and a pixel electrode, and the pixel electrode faces a common electrode disposed on the color filter substrate while interposing the liquid crystal layer therebetween. Accordingly, a transmittance of a light passing through the liquid crystal layer is controlled by an intensity of an electric field generated between the pixel electrode and the common electrode, thereby displaying an image having a desired gray scale through the LCD panel part 924.

The common electrode voltage generator 922 generates a common electrode voltage Vcom based on the direct current voltage of which level is varied by the DC/DC converter 921 and provides the common electrode voltage Vcom to the LCD panel part 924.

The gamma voltage generator 923 generates a gamma voltage Vdd based on the direct current voltage of which level is varied by the DC/DC converter 921 and provides the gamma voltage Vdd to the LCD panel part 924. In FIG. 9, the common electrode voltage generator 922 and the gamma voltage generator 923 are shown as being separated from the LCD panel part 924, however, the invention should not be construed as being limited thereto. That is, the common electrode voltage generator 922 and the gamma voltage generator 923 may be included in the LCD panel part 924.

The backlight unit 930 includes the backlight driver 931 and the backlight 932. The backlight driver 931 includes the control IC of the constant current driving circuit according to the exemplary embodiment shown in FIG. 8. The backlight 932 includes the M number of LED strings 700 (M>2) shown in FIG. 8. When the image is displayed through the LCD panel part 924, the backlight 932 controls the turned-on time period of the M number of LED strings 700, thereby controlling brightness of the image.

In FIG. 9, the AC/DC power supply 910 is described as being separated from the LCD module 920, however, the invention should not be construed as being limited thereto. In alternative embodiments, the AC/DC power supply 910 may be included in the LCD module 920.

Since the liquid crystal display 900 includes the constant current driving circuit according to fourth exemplary embodiment, the backlight unit 930 may reduce the power consumption thereof.

Figure 10:
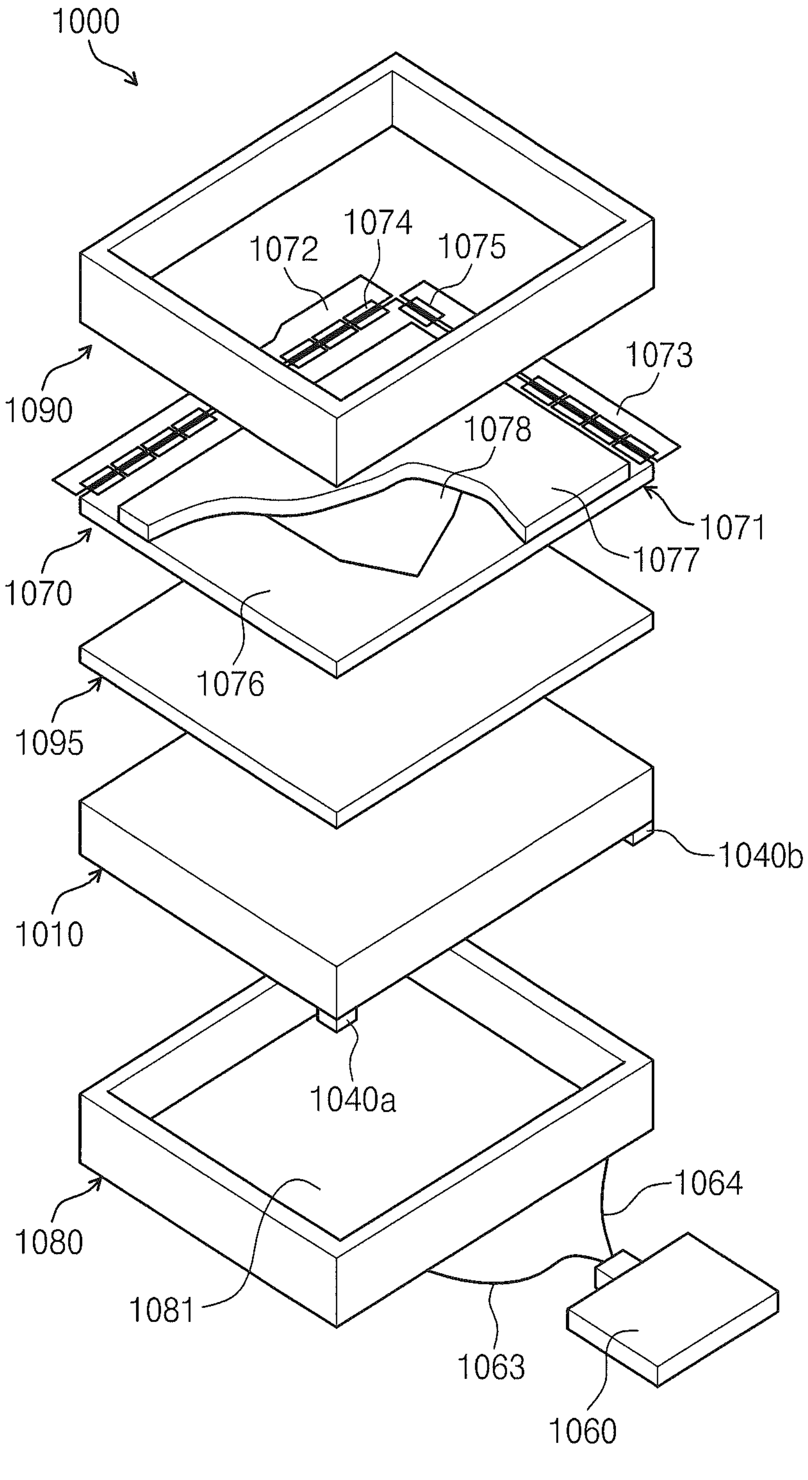
FIG. 10 is an exploded perspective view showing an exemplary embodiment of a liquid crystal display of the invention.
Figure 11:
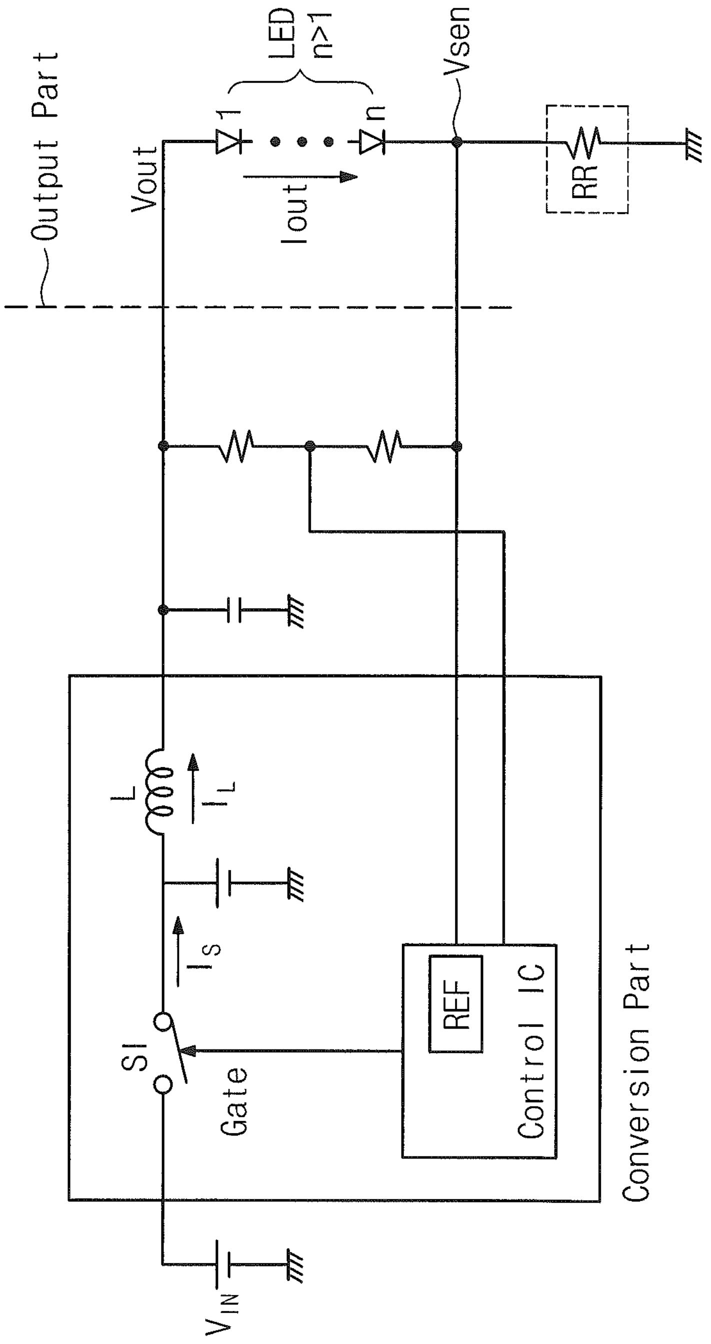
Fig. 11 (Related Art)
FIG. 11 is a circuit diagram showing a conventional constant current driving circuit.
Figure 12:
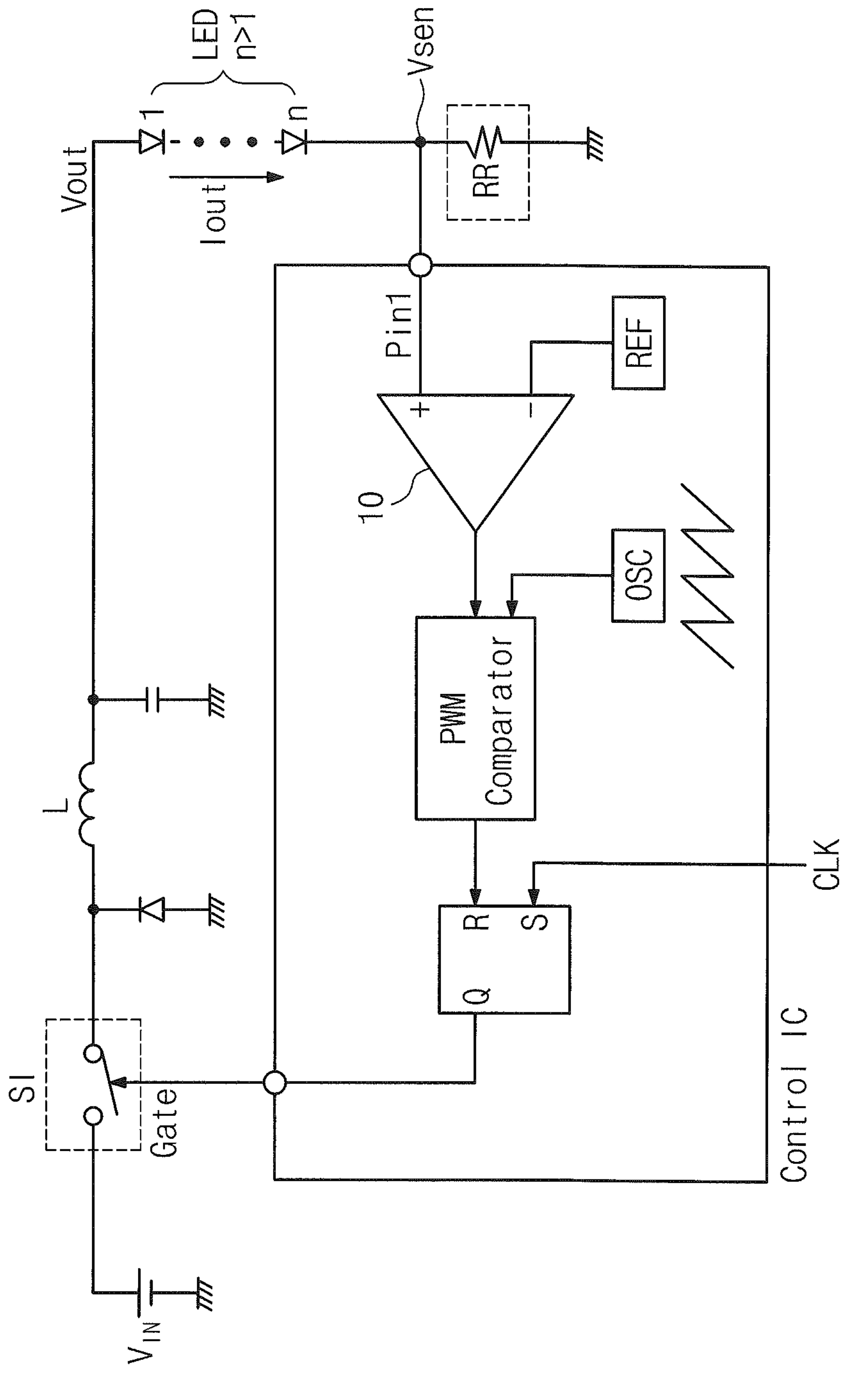
Fig. 12 (Related Art)
FIG. 12 is a circuit diagram showing a conventional constant current driving circuit.
Figure 13:
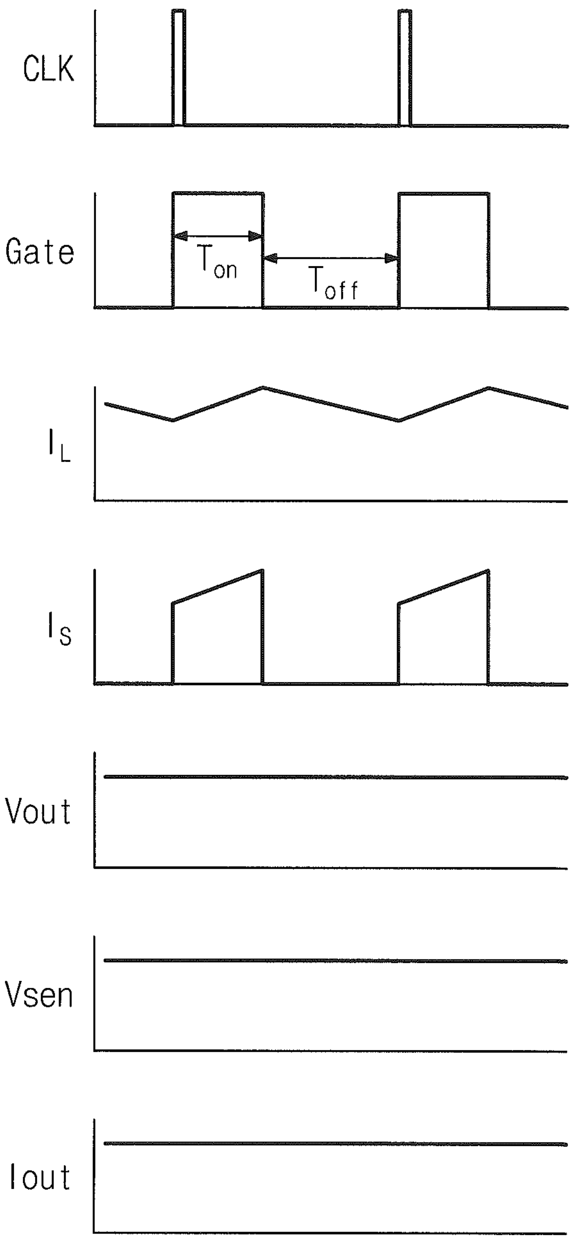
Fig. 13 (Related Art)
FIG. 13 is a view showing waveforms of signals in a control integrated circuit ("IC") of the conventional constant current driving circuit shown in FIGS. 11 and 12.
Figure 14:
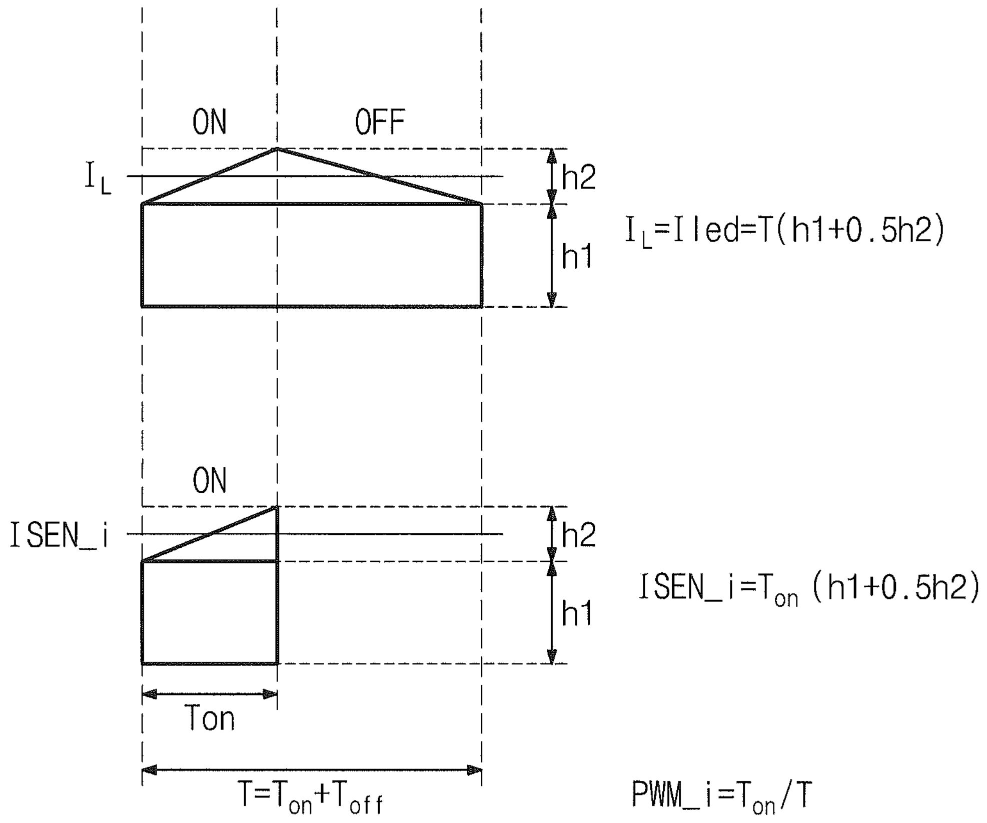
Fig. 14 (Related Art)
FIG. 14 is a view showing a basic operation of a conventional constant current driving circuit.

FIG. 10 is an exploded perspective view showing an exemplary embodiment of a liquid crystal display according to the invention.

Referring to FIG. 10, a liquid crystal display 1000 includes a backlight assembly 1010, a display unit 1070, and a receiving container 1080.

The display unit 1070 includes a liquid crystal display panel 1071, and a data printed circuit board 1072 and a gate printed circuit board 1073, which each output driving signals to drive the liquid crystal display panel 1071. The data printed circuit board 1072 is electrically connected to the liquid crystal display panel 1071 through a data tape carrier package 1074. The gate printed circuit board 1073 is electrically connected to the liquid crystal display panel 1071 through a gate tape carrier package 1075.

The liquid crystal display panel 1071 includes a thin film transistor ("TFT") substrate 1076, a color filter substrate 1077 coupled with the TFT substrate 1076, and a liquid crystal layer 1078 interposed between the TFT substrate 1076 and the color filter substrate 1077.

Although not shown in FIG. 10, the TFT substrate 1076 includes a plurality of pixels arranged thereon in a matrix form, and each pixel includes a TFT (not shown) as a switching device. The TFT substrate 1076 may be formed of a transparent material (e.g., a glass). The TFT includes a gate electrode connected to a gate line, a source electrode connected to a data line, and a drain electrode connected to a pixel electrode formed of a transparent conductive material.

The color filter substrate 1077 includes a color filter layer (not shown) and a common electrode (not shown). The color filter layer includes red (R), green (G), and blue (B) color pixels corresponding to the pixels, respectively. The common electrode may be formed of a transparent conductive material.

The receiving container 1080 provides a receiving space 1081 therein. The backlight assembly 1010 and the liquid crystal display panel 1071 are accommodated in the receiving space 1081 and fixed to the receiving container 1080.

In order to accommodate the backlight assembly 1010, the receiving space 1081 has a shape corresponding to that of the backlight assembly 1010 when viewed in plan.

In an exemplary embodiment, the receiving space 1081 and the backlight assembly 1010 may have a rectangular shape in plan, as shown in FIG. 10.

The liquid crystal display 1000 further includes a backlight driver 1060 and a top chassis 1090.

The backlight driver 1060 is accommodated in the receiving space 1081 of the receiving container 1080 and generates a direct current to drive the backlight assembly 1010. The direct current generated by the backlight driver 1060 is applied to the backlight assembly 1010 through a first power supply voltage applying line 1063 and a second power supply voltage applying line 1064. The first power supply voltage applying line 1063 may be directly connected to an anode 1040*a* of an LED string (not shown) disposed at a side portion of the backlight assembly 1010 or connected to the anode 1040*a* through a separate member (not shown). The second power supply voltage applying line 1064 may be directly connected to a cathode 1040*b* of the LED string disposed at another side portion of the backlight assembly 1010 or connected to the cathode 1040*b* through a separate member.

The top chassis 1090 is coupled with the receiving container 1080 to cover an edge portion of the liquid crystal display panel 1071. The top chassis 1090 effectively prevents the liquid crystal display panel 1071 from being damaged by an external impact and from being separated from the receiving container 1080.

The liquid crystal display 1000 may further include at least one optical sheet 1095 to improve optical properties of a light emitting from the backlight assembly 1010. The optical sheet 1095 may include a diffusion sheet to diffuse the light or a prism sheet to condense the light.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A constant current driving circuit comprising:
- a control integrated circuit which generates a switching signal;
- a switching device which includes an input terminal to which an input power supply voltage is applied and switches the input power supply voltage based on the switching signal;
- a rectifying diode which rectifies a current of the input power supply voltage which is switched by the switching device;
- a smoothing inductor which smoothes the current of the input power supply voltage; and
- a smoothing condenser which outputs an output current, the control integrated circuit comprising:
  - a reference signal generator which generates a reference signal having information about a target constant current;
  - a comparator which compares the current of the input power supply voltage with the reference signal and outputs a reset signal;
  - a flip-flop circuit which outputs a flip-flop signal having information about a time period during which a set state is maintained based on an external clock received as a set signal and the reset signal; and
  - a delay circuit which outputs the switching signal directly to the switching device based on the flip-flop signal and controls the switching device.

2. The constant current driving circuit of claim 1, further comprising:
- a current detector which detects a current which is provided to the switching device; and
- a slope compensation circuit which is connected between the current detector and the comparator.

3. The constant current driving circuit of claim 2, wherein an inductance of the smoothing inductor, a capacitance of the smoothing condenser, and a period of the set signal are determined such that a current flowing through the smoothing inductor has a value larger than zero when the switching device is in a turned-on state or a turned-off state.

4. The constant current driving circuit of claim 3, further comprising a control circuit which applies an OFF signal to the switching device independently from the delay circuit and compulsively transits the switching device to the turned-off state.

5. A light emitting apparatus comprising:
- a plurality of light emitting devices which are connected to one another in parallel; and
- a constant current driving circuit comprising:
  - a control integrated circuit which generates a switching signal;
  - a switching device which includes an input terminal to which an input power supply voltage is applied and switches the input power supply voltage based on the switching signal;
  - a rectifying diode which rectifies a current of the input power supply voltage which is switched by the switching device;
  - a smoothing inductor which smoothes the current of the input power supply voltage; and
  - a smoothing condenser which outputs an output current, the control integrated circuit comprising:
    - a reference signal generator which generates a reference signal having information about a target constant current;
    - a comparator which compares the current of the input power supply voltage with the reference signal and outputs a reset signal;
    - a flip-flop circuit which outputs a flip-flop signal having information about a time period during which a set state is maintained based on an external clock received as a set signal and the reset signal; and a delay circuit which outputs the switching signal directly to the switching device based on the flip-flop signal and controls the switching device.

6. A liquid crystal display comprising:

a liquid crystal panel which displays an image; and a light emitting apparatus which provides a light to the liquid crystal panel, the light emitting apparatus comprising:

a plurality of light emitting devices which are connected to one another in parallel; and a constant current driving circuit comprising:

a control integrated circuit which generates a switching signal;

a switching device which includes an input terminal to which an input power supply voltage is applied, and switches the input power supply voltage based on the switching signal;

a rectifying diode which rectifies a current of the input power supply voltage which is switched by the switching device;

a smoothing inductor which smoothes the current of the input power supply voltage; and a smoothing condenser which outputs an output current, wherein the control integrated circuit comprises:

a reference signal generator which generates a reference signal having information about a target constant current;

a comparator which compares the current of the input power supply voltage with the reference signal and outputs a reset signal;

a flip-flop circuit which outputs a flip-flop signal having information about a time period during which a set state is maintained based on an external clock received as a set signal and the reset signal; and a delay circuit which receives the flip-flop signal and outputs the switching signal directly to the switching device based on the flip-flop signal and controls the switching device.

7. A constant current driving circuit comprising:

a load circuit which is driven at a constant current;

a constant power supply voltage which is connected to a high voltage terminal of the load circuit;

a converter which is connected to a low voltage terminal of the load circuit; and a control integrated circuit which is connected to the converter and generates a switching signal, the converter comprising:

a switching device which includes an input terminal to which an input power supply voltage is applied, and switches the input power supply voltage based on the switching signal;

a rectifying diode which rectifies a current of the input power supply voltage which is switched by the switching device;

a smoothing inductor which smoothes the current of the input power supply voltage;

a smoothing condenser which outputs an output current; and a resistor including a first terminal which is connected to a low voltage terminal of the switching device and a second terminal grounded, wherein the control integrated circuit comprises:

a reference signal generator which generates a reference signal having information about a target constant current;

a comparator which compares the current of the switching device with the reference signal and outputs a reset signal, the current of the switching device being measured based on a current flowing through the resistor;

a flip-flop circuit which outputs a flip-flop signal having information about a time period during which a set state is maintained based on an external clock received as a set signal and the reset signal; and a delay circuit which outputs the switching signal directly to the switching device based on the flip-flop signal and controls the switching device.

8. The constant current driving circuit of claim 7, further comprising:

a current detector which detects a current which is provided to the switching device; and a slope compensation circuit which is connected between the current detector and the comparator.

9. The constant current driving circuit of claim 8, wherein an inductance of the smoothing inductor, a capacitance of the smoothing condenser, and a period of the set signal are determined such that a current flowing through the smoothing inductor has a value larger than zero when the switching device is in a turned-on state or a turned-off state.

10. The constant current driving circuit of claim 9, further comprising a control circuit which applies an OFF signal to the switching device independently from the delay circuit to compulsively transit the switching device to the turned-off state.

11. A light emitting apparatus comprising:

a plurality of light emitting devices which are connected to one another in parallel; and a constant current driving circuit comprising:

a load circuit driven at a constant current;

a constant power supply voltage which is connected to a high voltage terminal of the load circuit;

a converter which is connected to a low voltage terminal of the load circuit; and a control integrated circuit which is connected to the converter and generates a switching signal, the converter comprising:

a switching device which includes an input terminal to which an input power supply voltage is applied, and switches the input power supply voltage based on the switching signal;

a rectifying diode which rectifies a current of the input power supply voltage which is switched by the switching device;

a smoothing inductor which smoothes the current of the input power supply voltage;

a smoothing condenser which outputs an output current; and a resistor including a first terminal which is connected to a low voltage terminal of the switching device and a second terminal grounded, wherein the control integrated circuit comprises:

a reference signal generator which generates a reference signal having information about a target constant current;

a comparator which compares the current of the switching device with the reference signal and outputs a reset signal, the current of the switching device being measured based on a current flowing through the resistor;

a flip-flop circuit which outputs a flip-flop signal having information about a time period during which a set state is maintained based on an external clock received as a set signal and the reset signal; and a delay circuit which outputs the switching signal to the switching device based on the flip-flop signal and controls the switching device.

12. A liquid crystal display comprising:

a liquid crystal panel which displays an image; and a light emitting apparatus which provides a light to the liquid crystal panel, the light emitting apparatus comprising:

a plurality of light emitting devices which are connected to one another in parallel; and a constant current driving circuit, the constant current driving circuit comprising:

a load circuit driven at a constant current;

a constant power supply voltage which is connected to a high voltage terminal of the load circuit;

a converter which is connected to a low voltage terminal of the load circuit; and a control integrated circuit which is connected to the converter and generates a switching signal, the converter comprising:

a switching device which includes an input terminal to which an input power supply voltage is applied, and switches the input power supply voltage based on the switching signal;

a rectifying diode which rectifies a current of the input power supply voltage which is switched by the switching device;

a smoothing inductor which smoothes the current of the input power supply voltage;

a smoothing condenser which outputs an output current; and a resistor including a first terminal which is connected to a low voltage terminal of the switching device and a second terminal grounded, wherein the control integrated circuit comprises:

a reference signal generator which generates a reference signal having information about a target constant current;

a comparator which compares the current of the switching device with the reference signal and outputs a reset signal, the current of the switching device being measured based on a current flowing through the resistor;

a flip-flop circuit which outputs a flip-flop signal having information about a time period during which a set state is maintained based on an external clock received as a set signal and the reset signal; and a delay circuit which outputs the switching signal directly to the switching device based on the flip-flop signal and controls the switching device.

* * * * *